United States Patent
Zhang et al.

(10) Patent No.: US 10,885,076 B2
(45) Date of Patent: Jan. 5, 2021

(54) COMPUTERIZED SYSTEM AND METHOD FOR SEARCH QUERY AUTO-COMPLETION

(71) Applicant: VERIZON MEDIA INC., New York, NY (US)

(72) Inventors: Lizi Zhang, Urbana, IL (US); Hongbo Deng, Sunnyvale, CA (US); Amit Goyal, Sunnyvale, CA (US); Yi Chang, Sunnyvale, CA (US); Ricardo Baeza-Yates, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 164 days.

(21) Appl. No.: 16/057,319

(22) Filed: Aug. 7, 2018

(65) Prior Publication Data

US 2018/0349387 A1    Dec. 6, 2018

Related U.S. Application Data

(63) Continuation of application No. 14/869,435, filed on Sep. 29, 2015, now Pat. No. 10,049,149.

(51) Int. Cl.
*G06F 17/00* (2019.01)
*G06F 16/332* (2019.01)
*G06Q 30/02* (2012.01)
*G06F 16/338* (2019.01)

(52) U.S. Cl.
CPC ........ *G06F 16/3322* (2019.01); *G06F 16/338* (2019.01); *G06F 16/3329* (2019.01); *G06Q 30/0256* (2013.01)

(58) Field of Classification Search
CPC ............. G06F 16/3322; G06F 16/3325; G06F 16/338; G06F 16/3329; G06F 16/0256; G06Q 30/0256
See application file for complete search history.

(56) References Cited

U.S. PATENT DOCUMENTS

| | | |
|---|---|---|
| 8,412,728 B1 * | 4/2013 | Roskind ............. G06F 16/3322 707/767 |
| 8,645,825 B1 | 2/2014 | Cornea et al. |
| 8,713,042 B1 | 4/2014 | Zinenko et al. |
| 9,122,376 B1 * | 9/2015 | Brotherston .......... G06F 3/0482 |
| 9,582,608 B2 | 2/2017 | Bellegarda |
| 9,678,933 B1 | 6/2017 | Phillips et al. |
| 9,922,344 B1 * | 3/2018 | Christophe ........ G06Q 30/0256 |

(Continued)

*Primary Examiner* — Greta L Robinson
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for determining and suggesting query auto-completions (QACs). In some embodiments, when a user is inputting a search query, the disclosed systems and methods can provide a QAC suggestion based on the inputted text in addition to application programs installed and/or executing on the user's device.

18 Claims, 8 Drawing Sheets

(56) References Cited

U.S. PATENT DOCUMENTS

| | | | |
|---|---|---|---|
| 10,025,849 B2* | 7/2018 | Kim | G06N 5/04 |
| 10,049,149 B2* | 8/2018 | Zhang | G06F 16/3322 |
| 2007/0265831 A1 | 11/2007 | Dinur et al. | |
| 2008/0256061 A1* | 10/2008 | Chang | G06Q 30/0244 |
| 2014/0181100 A1 | 6/2014 | Ramer et al. | |
| 2014/0181692 A1 | 6/2014 | Gupta | |
| 2014/0207748 A1 | 7/2014 | Sood et al. | |
| 2015/0161221 A1 | 6/2015 | Carpenter et al. | |
| 2016/0275194 A1 | 9/2016 | Borza et al. | |

* cited by examiner

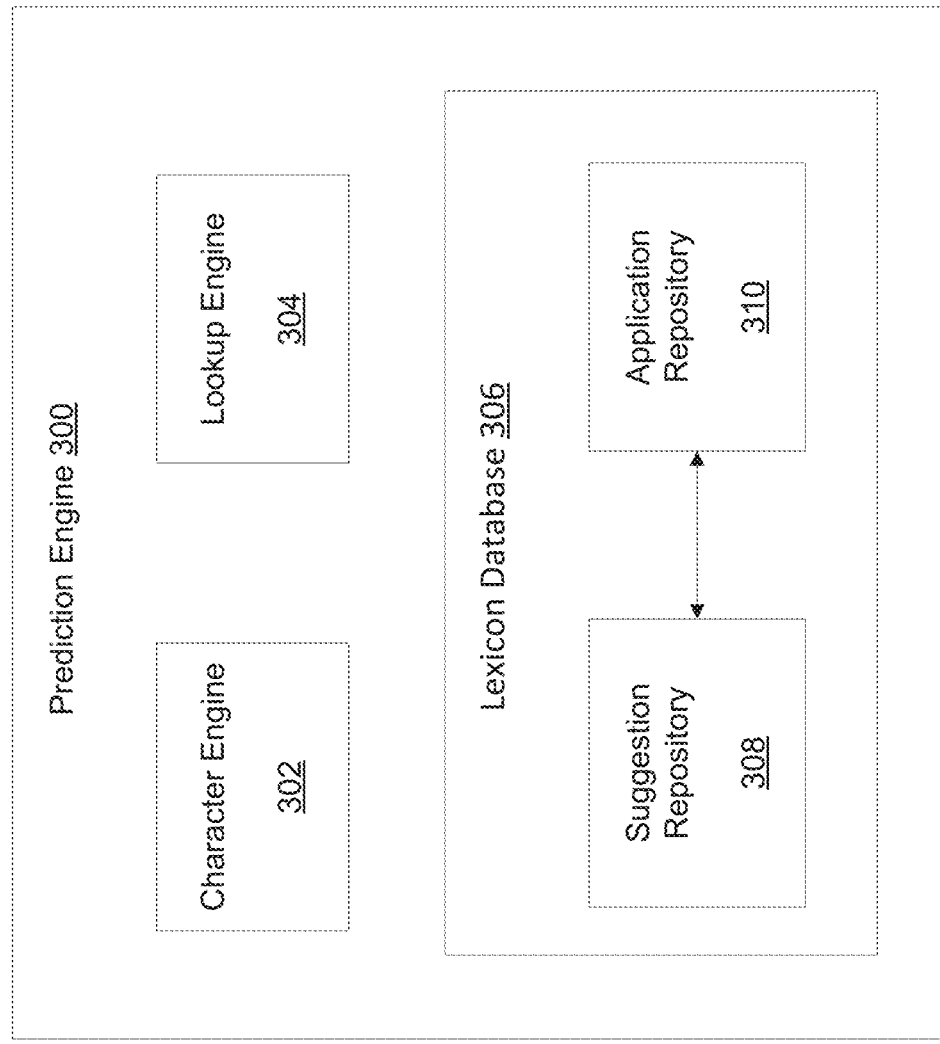

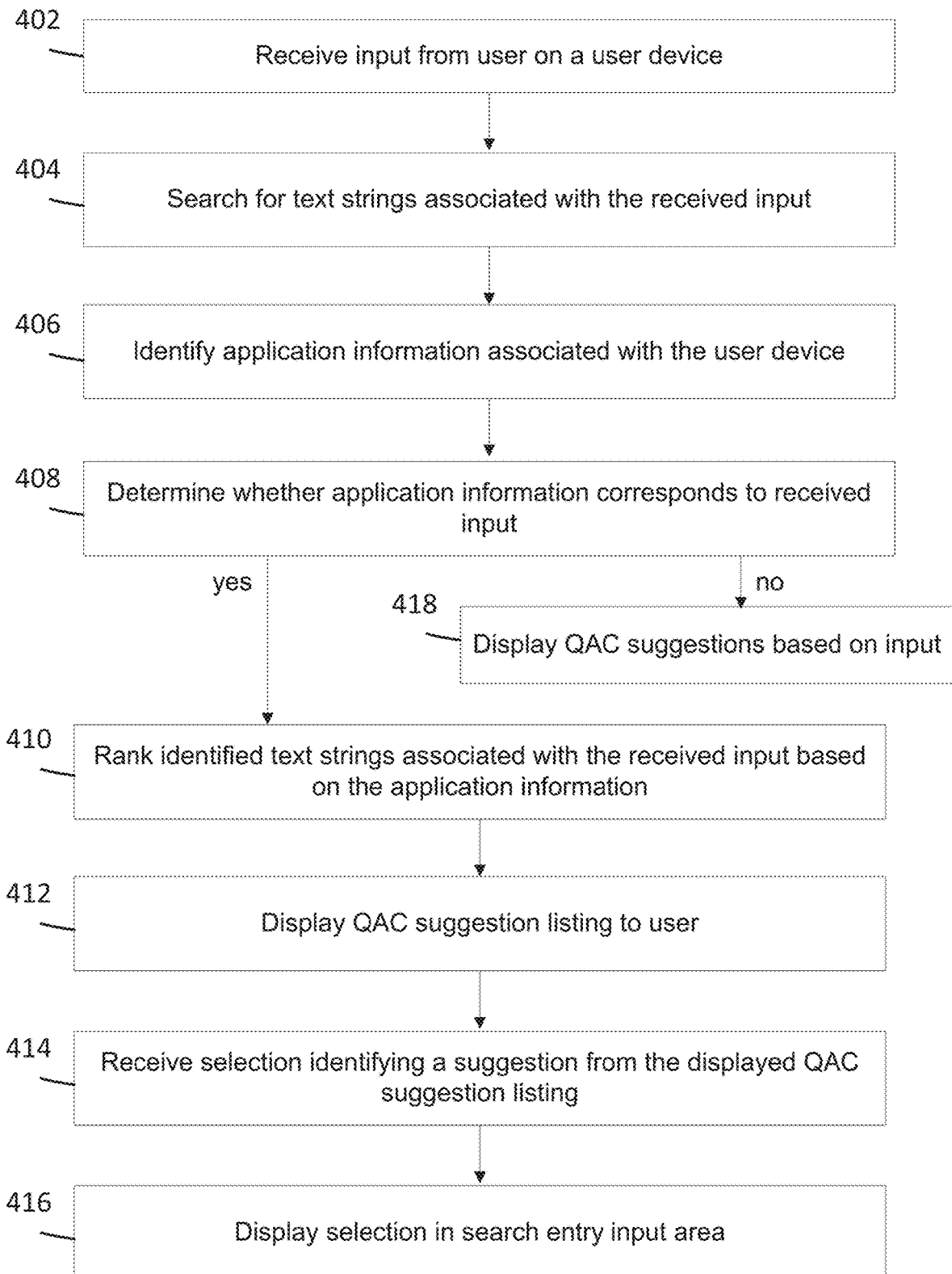

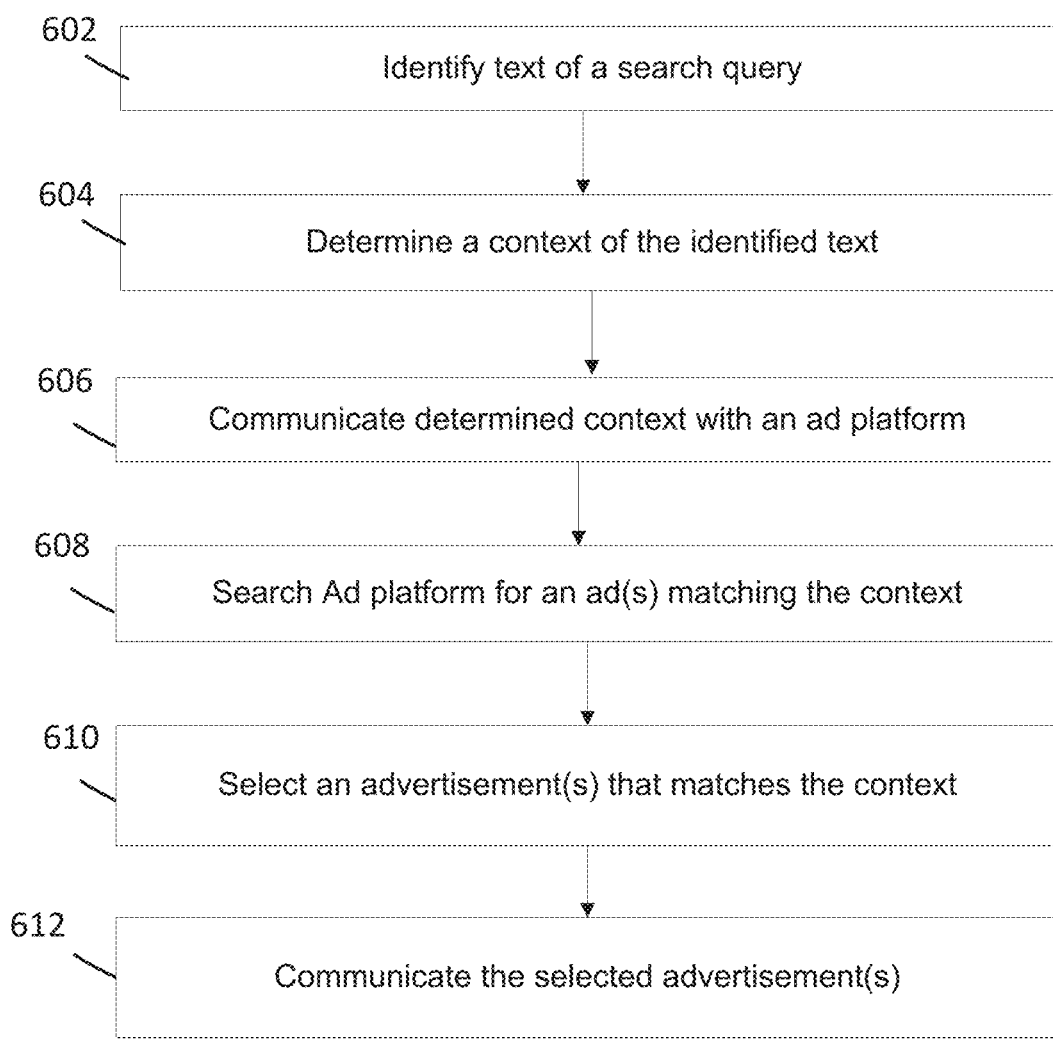

COMPUTERIZED SYSTEM AND METHOD FOR SEARCH QUERY AUTO-COMPLETION

CROSS-REFERENCE TO RELATED APPLICATIONS

This application claims the benefit of and is a continuation of U.S. patent application Ser. No. 14/869,435, filed on Sep. 29, 2015, titled "Computerized System and Method for Search Query Auto-Completion", which is incorporated by reference herein its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer systems and/or platforms by modifying the capabilities and providing non-native functionality to such systems and/or platforms for determining and suggesting search query auto-completions.

SUMMARY

In general, the present disclosure provides systems and methods for improved query auto-completion (QAC). According to some embodiments, the disclosed systems and methods provide a novel technique(s) for mobile QAC. The disclosed systems and methods leverage information related to recently or preciously installed and/or open applications residing and/or executing on a user's device in order to suggest a list of query suggestions when a user is determined to be entering a search query. Suggestions related to installed or open applications are ranked higher in the suggestion listing provided to a user.

The disclosed systems and methods provide an auto-complete (or text-prediction) technique(s) that can assist a user in quickly generating a contextually relevant and accurate string of characters for a search request. In some embodiments, the disclosure herein involves augmenting existing search platforms, services, applications and/or engines, executing on a computing device, with an auto-completion suggestion feature(s) or capability that learns from installed and/or opened or currently running applications associated with a user's device. This novel functionality provides the searching user with a suggestion (or prediction) of a personalized list of possible input entry suggestions.

It will be recognized from the disclosure herein that embodiments of the instant disclosure provide improvements to a number of technology areas, for example those related to systems and processes that handle or process search queries and digital message generation and processing, such as but not limited to, search engines, e-mail or other types of text messaging platforms, electronic social networking platforms and the like. The disclosed systems and methods can effectuate increased speed and efficiency in ways users enter text, in addition to an increased contextual relevancy per user regarding displayed results, thereby reducing user effort, as the disclosed systems and methods, inter alia, reduce the amount of required input for a user upon generating a text entry on a computing device. In fact, as global users are trending more towards a reliance on mobile devices, the impact of the disclosed systems and methods will lead to an increased user experience not only on those devices, but also within the applications the users are executing on such devices. Users will be provided a more fluid and personalized experience through the disclosed systems and methods leveraging of information present on the user's device which will enable the user to avoid having to provide all aspects of desired/requested information.

In accordance with one or more embodiments, a method is disclosed which includes receiving, at a computing device over a network, user input information from a user device, the user input information comprising a character string of at least one character and a device identifier (ID); determining, via the computing device, a set of text suggestions that begin with the character string from a lexicon database; identifying, via the computing device, an application associated with the user device based on the device ID; compiling, via the computing device, a query auto-complete (QAC) suggestion listing based on the set of text suggestions and the identified application, the compiling comprising determining a text suggestion in the set that is associated with the identified application, the QAC suggestion listing comprising the determined text suggestion ranked higher than other text suggestions in the set that are not associated with the application; and communicating, via the computing device over the network, the QAC suggestion listing for display on the user device.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for determining and suggesting search query auto-completions.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 is a schematic block diagram illustrating components of an exemplary system in accordance with embodiments of the present disclosure;

FIG. 4 is a flowchart illustrating steps performed in accordance with some embodiments of the present disclosure:

FIG. 6 is a flowchart illustrating steps performed in accordance with some embodiments of the present disclosure.

DESCRIPTION OF EMBODIMENTS

Figure 1:
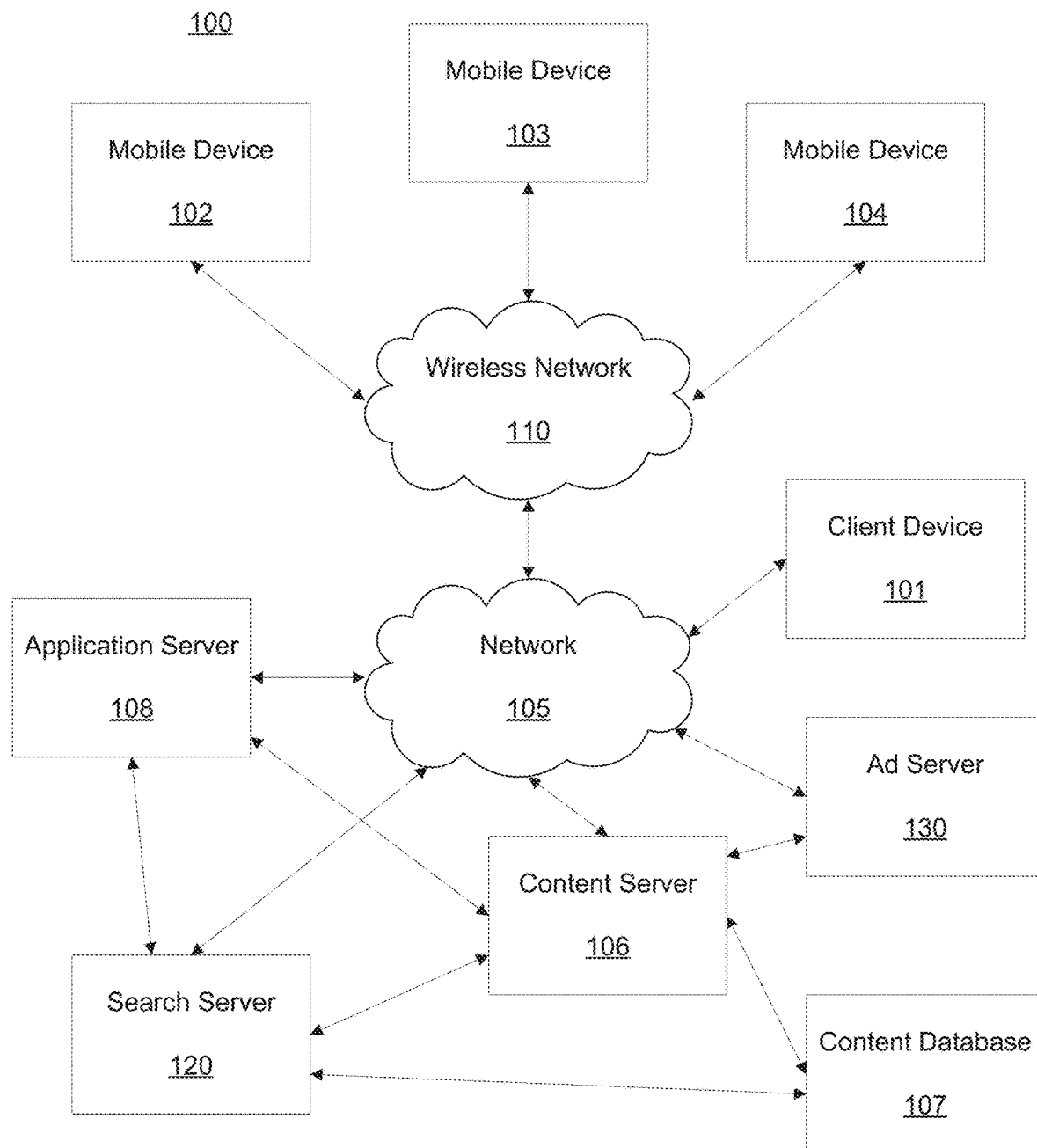
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation. (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), far example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, conventional auto-complete features, such as those commonly found in search engines or text messaging applications (e.g., Short Message Service (SMS) or other Instant Messaging applications), predict a word and/or phrase a user is inputting based upon a set of one or more characters that the user has previously inputted. The more characters that the user inputs, the narrower the field of possible words/phrases, and generally, the better the prediction can become. One common implementation involves applying a probability of related words (or phrases) that have a prefix that matches the character(s) the user has input (or selected). For example, upon a user entering a character "J", conventional systems would identify respective words beginning with a letter "J" based on a predefined prefix hierarchy, where "J" is the root within the hierarchy tree. Here, a probability for words (or phrases) respective to the root character, e.g., "J", would be computed and the words that are deemed more probable would be identified and presented to the user. This probability application exhibits the limitations in the current state of the art, as the majority of text completions are often static, repetitive, generic and often computationally insensitive.

The presently disclosed systems and methods describe improved systems and methods for suggesting auto-completions for entered text. According to some embodiments, the disclosed systems and methods provide added functionality to auto-completion (or text-prediction) systems by leveraging information related to installed, previously opened and/or currently opened applications on a user's device. In some embodiments, previously opened applications having an influence on auto-completion suggestions involve applications that were opened (and in some embodiments not necessarily closed) within a time period that satisfies a temporal threshold. For example, some users never close applications on their device. Therefore, if a user opened an application 4 hours ago, he/she may not still be interested in information related to that application. However, if a user opened an application 15 minutes ago, and even though he/she has subsequently closed that application, the user could be determined to still be interested in that application. In some embodiments, the fact that the user has closed the application may provide information to disregard the information related to such application. A more detailed discussion of these embodiments and other will be discussed in more detail below.

It should be understood that reference to applications executing on (or being associated with) a user's device can include, but are not limited to, downloaded and installed applications, cloud-based applications that execute over a network on the user's device, applications executing on a connected or tethered device to the user's device (e.g., a smart watch paired with a smart phone), applications purchased and residing in a user's local or cloud storage (e.g., an application that was downloaded and stored in a user's iTunes® or iCloud® library, where the application may or may not be currently installed on the user's device), and the like.

For purposes of this disclosure, reference will be made to a user's device being a mobile device; however, it should not be construed as limiting, as a person of ordinary skill in the art would recognize that any type of device that can handle user input (e.g., text entry) can be utilized by the disclosed systems and methods without departing from the scope of the instant disclosure.

According to some embodiments, the disclosed systems and methods can be implemented upon a user entering a search query within any type of computerized platform that handles search queries, including but not limited to, search engines, email platforms, applications, messaging, platforms, cloud-based platforms, searching a database, and the like. In some embodiments, the disclosed systems and methods can be utilized for recommending auto-completions upon a user drafting a message or any other type of known or to be known text entry that can be optimized by suggested auto-completions. For purposes of this disclosure, the instant disclosure will focus on entering a search query; however, it should not be construed as limiting the disclosed systems and methods solely to such embodiments, as a person of ordinary skill in the art would recognize that any type of user input embodiment is applicable herein without departing from the scope of the present disclosure. Thus, solely for reference purposes within this disclosure, the discussion related to auto-completions or text-prediction will be made via reference to query auto-completion (QAC).

The disclosed systems and methods provide QAC techniques that assist a user in quickly generating a contextually relevant and accurate string of characters for a search query. In some embodiments, the disclosure herein involves augmenting existing search platforms, services, applications and/or engines, executing on a computing device, with QAC suggestion feature(s) or capability based on installed and/or opened or currently opened applications associated with a user's device. This novel functionality provides the entering user with a suggestion (or prediction) of a personalized list of possible input entry suggestions.

The systems and methods discussed herein lend towards increased productivity and user experience upon entering search queries by leveraging the information derived from applications associated with the user's device. Auto-completion services are critical as typing can be a tedious task, especially on mobile devices. However, current completion services have been mostly reserved to query or command completion and have not been based on personalized information associated with a user's device, such as those applications that are executing on the user's device, which represents vital information reflecting the user's interests and activities. Thus, the disclosed systems and methods are adapted to provide, via suggestion or prediction features/services/applications, a personalized and diversified list of possible auto-completion suggestions.

By way of a non-limiting example, user Bob has installed on his mobile device a Chess application. With conventional systems, when Bob enters the text "che" as a search query, he may be presented with a listing of QAC suggestions that include, in priority order: "cheap flights", "cheap tickets", "Chevy". However, through the implementation of the disclosed systems and methods discussed herein, based on the determination that Bob has installed and/or recently opened or has currently opened on his device the Chess application, when Bob enters the search prefix "che", he can now be presented with QAC suggestions, in the following order: "chess", "cheap flights", "cheap tickets", "Chevy", where the "chess" suggestion has been added atop the suggestion listing due to the determination of such associated application being associated with his device. In some embodiments, as discussed in more detail below, the determination that Bob has the Chess application installed or executing on his device can result in re-ordering the QAC suggestions. For example, a conventional system may provide Bob with QAC suggestions as follows: "cheap flights", "cheap tickets", "chess", "Chevy". Now, via implementation of the disclosed systems and methods, the QAC suggestions can be re-ordered as follows: "chess", "cheap flights", "cheap tickets", "Chevy".

Thus, as discussed in more detail below, the disclosed systems and methods provide QAC suggestion techniques that efficiently and effectively leverage application information associated with a user's device to provide and/or rank suggested queries for an entered search prefix. This novel functionality provides, inter alia, the entering user with a suggestion (or prediction) of a list of possible input entry suggestions that are personalized to the user's derived interests, which are based, at least in part, on the applications associated with the user's device.

As discussed in more detail below at least in relation to FIG. 6, according to some embodiments, information associated with or derived from the entered search terms or characters, QAC suggestions and/or search results produced as a result of actually searching a selected QAC suggested search query, as discussed herein, can be used for monetization purposes and targeted advertising when providing, delivering or enabling access to searchable and/or searched content. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for and/or sharing photographs, audio clips, video clips, or any of a variety of other of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may thriller overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client, device 101, and through wireless network 110 to mobile devices 102-104. Network 105 is enabled to employ any form of computer readable media for communicating information front one electronic device to another. Also, network 105 can include the Internet in addition to local area networks (LANs), wide area networks (WANs), direct connections, such as through a universal serial bus (USB) port, other forms of computer-readable media, or ally combination thereof. On an interconnected set of LANs, including those based on differing architectures and protocols, a router acts as a link between LANs, enabling messages to be sent front one to another, and/or other computing devices.

Within the communications networks utilized or understood to be applicable to the present disclosure, such networks will employ various protocols that are used communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc, that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as a search engine (e.g., Yahoo! Search®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like, Devices that may operate as content server 106 include personal computers desktop computers, multiprocessor systems, microprocessor-based or programmable consumer electronics, network. PCs, servers, and the like.

Content server 106 can further provide a variety of services that include, but are not limited to, search services, email services, photo services, web services, social networking services, news services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad network/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo?®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a search application, blog, photo storage; sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
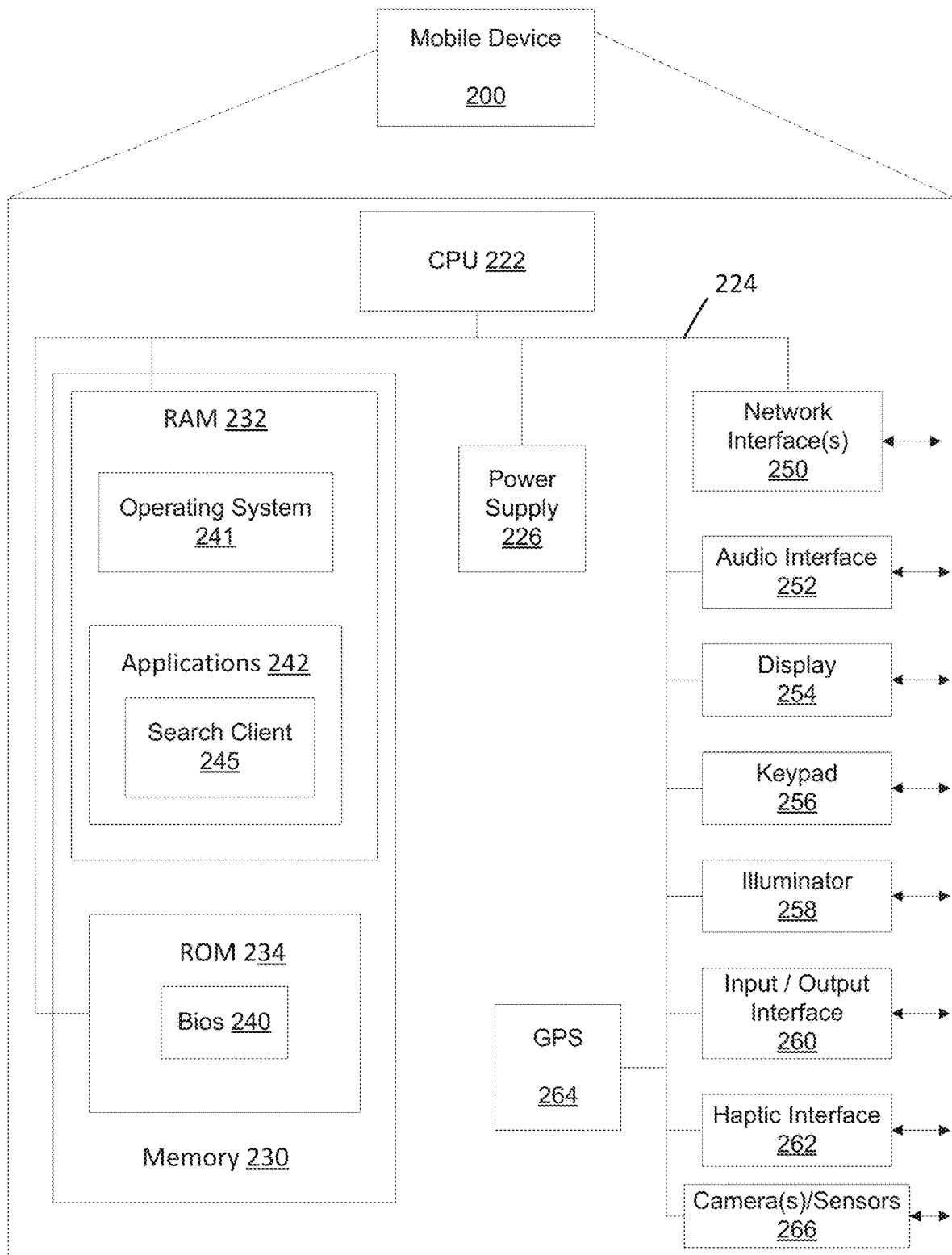
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a-base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an, object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG.

2. Input/output interlace 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional CPS transceiver 264 can determine the physical coordinates of Client device 200 on the surface of the Earth, which typically outputs a location as latitude and longitude values. CPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions. CPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search, client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

FIG. 3 is a block diagram illustrating the components for performing the systems and methods discussed herein. FIG. 3 depicts prediction engine 300, which can be a special purpose machine or processor and could be hosted by a user computing device, an application server, search server, messaging server, content server, social networking server, web server, content provider, email service provider, ad server, and the like, or any combination thereof. According to some embodiments, prediction engine 300 can be embodied as a stand-alone application that executes (in some embodiments in the background) on a mobile device. In some embodiments, the prediction engine 300 can function as an application installed on the user's device, and in some embodiments, such application can be a web-based application accessed by the user device over a network. In some embodiments, the prediction engine 300 can be installed as an augmenting script, program or application to another search application (e.g., Yahoo?® Search application).

Prediction engine 300 is configured to predict a word or words (e.g. phrases) based upon user input and application information associated with a user's device. Prediction engine 300 includes a character engine 302, lookup engine 304 and a lexicon database 306. It should be understood, that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed herein, and with specific reference in FIGS. 4-5B.

Database 306 can be any type of database or memory, and can be associated with a user's device (e.g., devices 101-104 or device 200 from FIGS. 1-2), a content server on a network (e.g., content server 106, search server 120, application server 108, and the like, from FIG. 1), or a network (e.g., networks 105 and/or 110 from FIG. 1), or some combination thereof. Database 306 can be housed within the prediction engine 300, or directly connected to the device hosting the prediction engine 300 by any known or to be known method of connecting and/or enabling communication between such devices and resources.

Database 306 comprises information within a suggestion repository 308 and an application repository 310. Such information can be stored in the database 306 independently and/or as a linked or associated dataset. The repositories 308 and 310 associated with database 306 may be embodied within the whole of the database 306, or may be individual repositories (or databases) which are in connection with database 306, or a combination thereof. Additionally, embodiments exist where the repositories 308 and 310 can be a single repository, where the information stored within each repository is stored as a linked collection of data/information.

In general, suggestion repository 308 comprises a lexicon of one or more words, by way of non-limiting example, a vocabulary, dictionary or catalogue of words/phrases (e.g., known or learned word combinations). In some embodiments, the lexicon information housed within the repository 308 can be arranged in accordance with various known or to be known models in order to preserve an efficient and accurate retrieval of query auto-complete (QAC) suggestions. According to some embodiments, the lexicon in repository 308 comprises one or more words arranged alphabetically, and in some embodiments, the words are arranged according to known or to be known language models. The words in the lexicon can be assigned a unique identifier, such as, but not limited to, a number or value. Unique identifiers are generally assigned such that words sharing a prefix have contiguous identifiers. As discussed herein, a "prefix" is a character set comprising one or more characters that forms the base or root of a word, words or phrase. For example, the received character set of "sha" is a prefix and is related to the words "sharp", "share" "shape" and other words beginning with the characters "sha." It should be understood that generally no two words (or phrases) in a lexicon are associated with the same unique identifier. Thus, a unique identifier should be unique to one word/phrase in the lexicon.

According to some embodiments, n-grams may be encoded using such word identifiers. As understood by those of skill in the art, an n-gram involves computational linguistics for a contiguous sequence of n-items from a given sequence of text. Thus, in the lexicon within repository 308, the one or more words can be arranged according to a language model utilized for predicting the next item in such a sequence. It should be understood that any known or to be known arrangement or model (e.g., Markov model) and/or algorithm can be used for arranging one or more words, and identifying such one or more words in the database 306 (i.e., repository 308). Thus, according to some embodiments, given an entered/input character set, a resulting n-gram can be quickly indexed without indexing letter based representations. Therefore, based upon a user inputted character set of one or more characters, a range of unique identifiers corresponding to words/phrases comprising the beginning with the input character set may be identified. It should be understood by those of skill in the art that any type of known or to be known letter based representations can be utilized in accordance with embodiments of the present disclosure.

By way of a non-limiting example solely for illustration purposes of indexing repository 308 and not intended to limit the scope of the present disclosure, the word "patent" may be assigned the identifier "1" and the word "patents" may be assigned the number "2". The incrementing of a value for the word "patents" from "patent" is due to the word "patents" following the word "patent" alphabetically in the lexicon, for example. According to some embodiments, because the respective words are uniquely identified sequentially, given a text string such as a word prefix, a range of unique identifiers that are associated with words having the given word prefix may be identified. For example, if the prefix "pat" were inputted by a user, unique identifiers 1 through 10 may be identified if the words (or phrases) associated with the unique identifiers of 1-10 begin with the prefix "pat", or are conjugations of the prefix. In another non-limiting example, words/phrases associated with a given prefix can be identified by identifying a range of words/phrases beginning with the entered prefix, where the first word in the lexicon matching the prefix and the last word are initially identified, and all intervening words/phrases are then identified based on their identifiers falling within the identified range.

In some embodiments, the lexicon in repository 308 can be specific to a user or a global lexicon (such as a generic or learned/trained lexicon). Thus, in some embodiments, the lexicon of words in repository 308 may be ranked or ordered according to the number of times a user or users has selected a word/phrase during a predetermined period. For example, user Bob has entered "Chi" in a search entry box 100 times in the past 2 weeks, and of those 100 times, he selected the word "Chicago Beat's" 80 times and "Chicago Bulls" 20 times. Therefore, this historical information can be used to refine the lexicon for Bob, whereby "Chicago Bears" would be suggested ahead of "Chicago Bulls." Thus, in some embodiments, the lexicon in repository 308 can be based on a user's or users' behavior (e.g., past search query activity—for example, words or phrases used in performing a search at or above a threshold (frequency over a predetermined time) which take precedence over global lexical norms and conventions). Therefore, in some embodiments, a determined frequency for which a user selects a suggested word or phrase may be utilized to organize how a lexicon stores or organizes words/phrases.

Repository 310 comprises information associated with applications that are associated with user's device. The application information can be associated with installed applications or web-based applications the user device executes over a network. In some embodiments, if the user's device is part of a connected pair (or logical unit), such as a smartphone and connected smart watch, the applications executed by the other connected device can form part of the application information for the device, and vice versa. Application information includes, but is not limited to, data (and metadata) indicating the identity (e.g., identifier) of an installed application on the user's device, the identity of a web-based application executing or executed by the device, temporal information indicating when such applications were last opened (or executed) and/or closed, and information indicating the user's activity performed in connection with such applications. Such information can be derived and stored in repository 310 based on information identified from a device's registry, program log, and the like, as well as from a user profile detailing a user's downloads, activity history and the like.

Character engine 302 is configured to receive input and/or a selection of characters from a user. For example, the user may enter text using a touchscreen device, keyboard, or other known or to be known input device, and the entered text or other user input may be received by the character engine 302. It should be understood that such text may herein be referred to as a received character set of one or more characters because the text generally comprises at least one character. Character engine 302 is operably coupled to the lookup engine 304 and is configured to transmit the received character set of one or more characters to the lookup engine 304.

In some embodiments, the character engine 302 may continue to receive additional input from the user after the initial first set of one or more characters (or prefix) are transmitted to the lookup engine 304. Thus, according to some embodiments, character engine 302 is configured to transmit the additional input (e.g., or updated input) to the lookup engine 304 after each input (e.g., keystroke). Therefore, the lookup engine 304, for example, can update the search to identify a range that corresponds to a word(s) in light of the additional characters (e.g., in real-time).

Lookup engine 304 is configured to compile a listing of query suggestions or completions, referred to as "QAC suggestions" or "QAC listing suggestions" (interchangeably), based on the received character set and the information comprised within the database 306 (i.e., the information within repositories 308 and 310). According to embodiments of the present disclosure, the lookup engine 304 is in communication with the database 306 and provides the input character set received from the character engine 302 as a request to the database 306. In some embodiments, the lookup engine 304 performs the searching the database 306, and in some embodiments, the lookup engine 304 provides a request for information to the database 306, where the information retrieved respective to the request is provided as a response to the lookup engine 304.

As discussed in more detail with respect to FIG. 4 and as an overview of the components of FIG. 3, an input prefix is received by the character engine 302 which is communicated to the lookup engine 304. The prefix is utilized by the lookup engine 304 to search the database 306 for QAC suggestions. According to some exemplary embodiments, the prefix is utilized to identify a number of QAC suggestions (from repository 308), where the number of suggestions are based on a variety of factors ranging from, but not limited to, screen space for presenting suggestions, to settings preset by a user, the system as a whole, an administrator, service provider, or an application, or some combination thereof. The identified QAC suggestions are then given a priority (e.g., ranked or ordered) based on application information (from repository 310). That is, the QAC suggestions that correspond to applications installed, previously executed or running on the user's device are slotted atop the QAC suggestion list. According to some embodiments, a priority may be given to applications that are installed on the user's device over those that are only web-enabled and accessed over a network. In some embodiments, applications that have more recently been executed, or are currently executing have priority over those that are less recent—in that, application data associated with the more recently executed applications have precedence in influencing the QAC suggestion re-ordering. The QAC suggestion list is then displayed to the user in connection with the search entry input area utilized for entering the prefix, which can be within an application or browser, or other type of application (e.g., an installed or web-based application) executing on the user's device.

As discussed in more detail below, the information processed by the prediction engine 300 (e.g., text input, application information and/or selection of a query completion) can be supplied to the database 306 in order to ensure that the information housed in the database 306 (e.g., the suggestion repository 308 and the application repository 310) is up-to-date as the disclosed systems and methods leverage real-time information and/or behavior associated the user, as discussed in more detail below.

Turning to FIG. 4, Process 400 details steps performed in accordance with exemplary embodiments of the present disclosure for determining and providing QAC suggestions to a user based on a user's entered text (e.g., text input—"prefix") and application information associated with a user's device.

Process 400 begins with Step 402 where user input (i.e., typed characters) entered into a search entry area of an application (which as discussed above can be a browser or other type of application running on the user's device) is received. The character(s) received in Step 402 are received by the character engine 302 of the prediction engine. The entered text string, referred to as a prefix as discussed above, is communicated to the lookup engine 304 after each key stroke. According to some embodiments, Step 402 also involves identifying a device identifier (ID) of the user device where the input is entered, as discussed below in more detail.

Figure 5A:
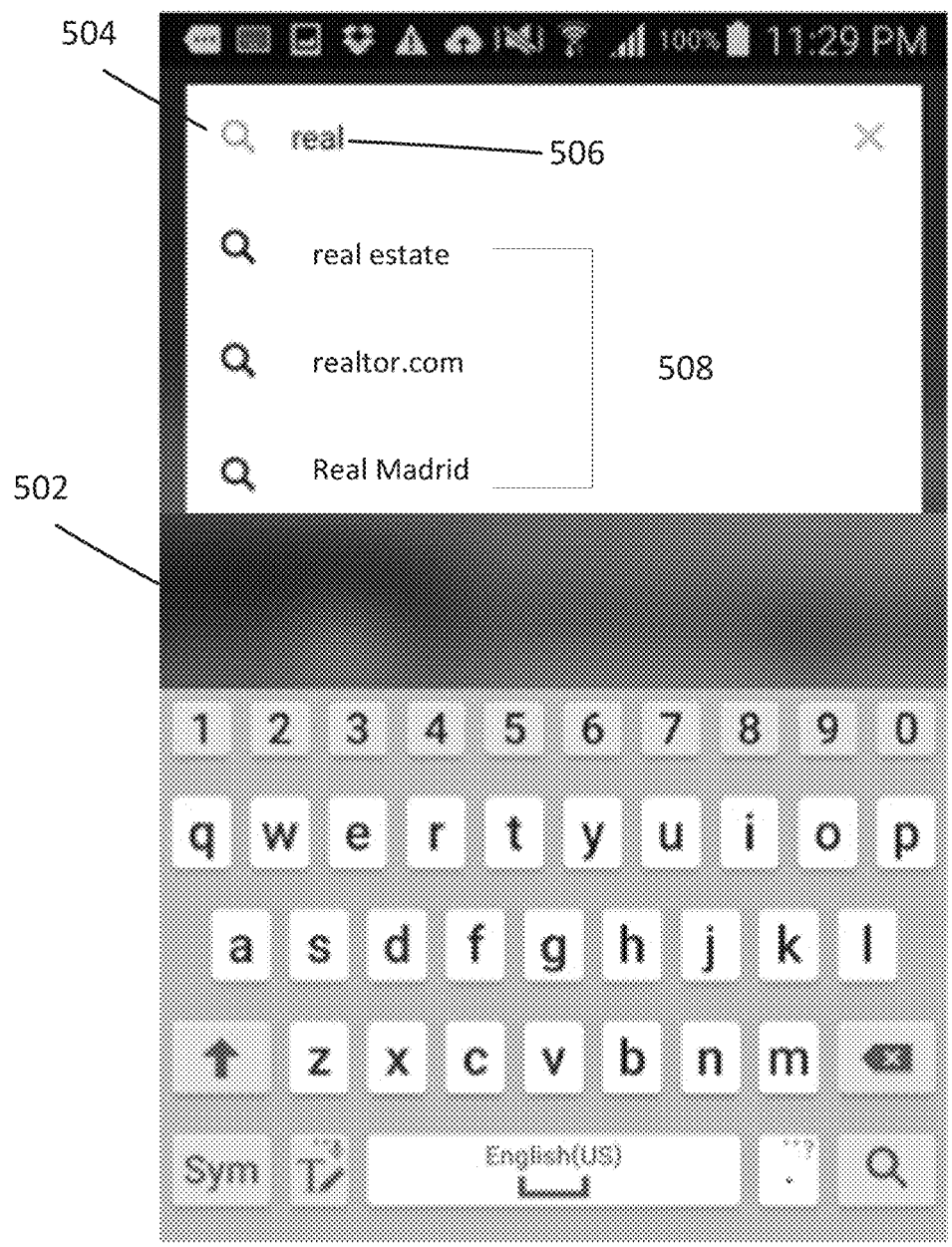
FIGS. 5A-5B illustrate non-limiting examples of QAC suggestion embodiments in accordance with some embodiments of the present disclosure.
Figure 5B:
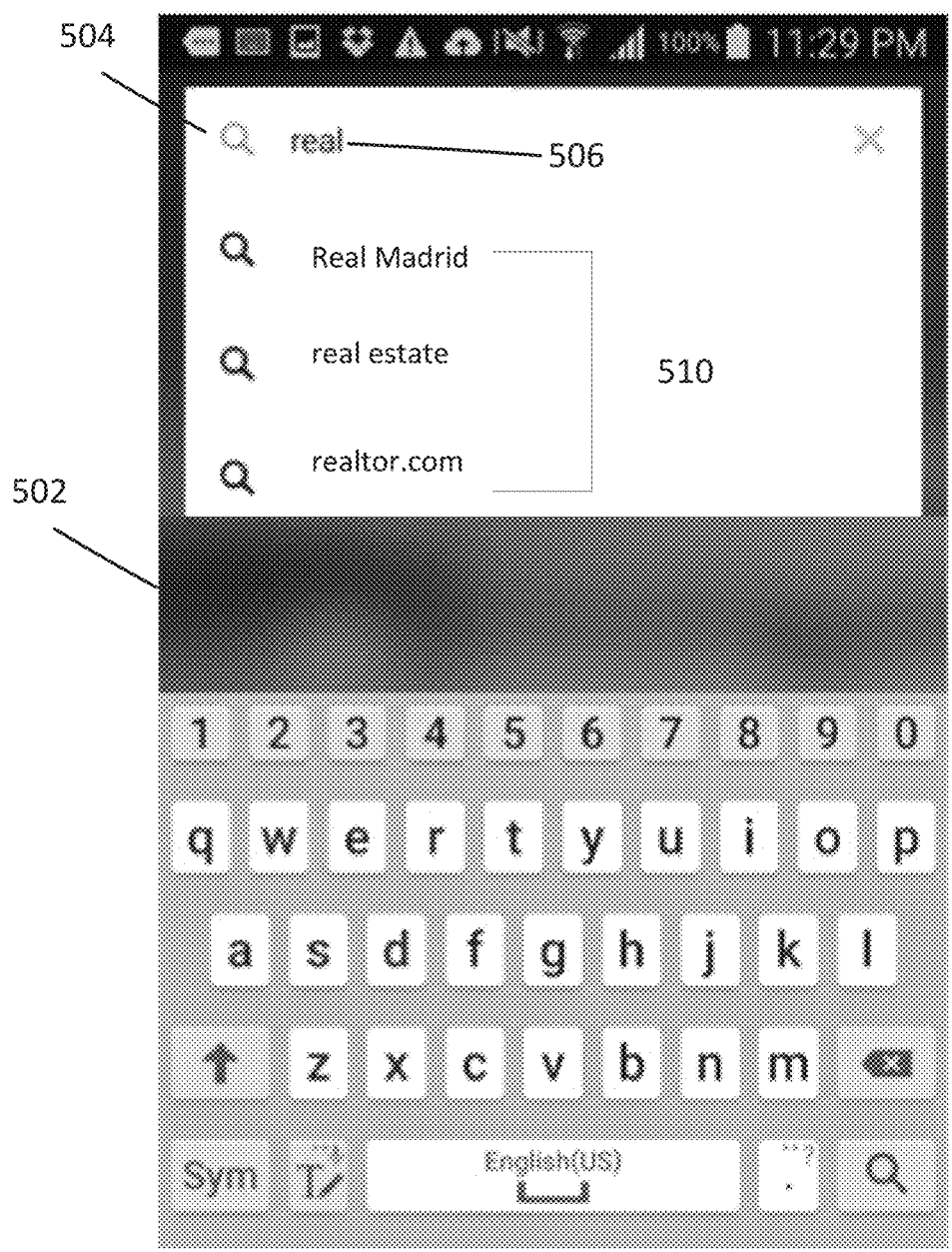

For purposes of this disclosure, and solely for illustration regarding the discussion herein, the string "real" will be referenced as the root/base prefix for finding QAC suggestions. As illustrated in FIGS. 5A-5B, for example, the user input text string "real" (item 506) was entered into search entry input area 504 within application interface 502. Therefore, "real" is used as the prefix 506 to identify other words or phrases that begin with "real".

In Step 404, the suggestion repository 308 is searched in order to fetch a predetermined number of words (or text strings) that start with the received prefix. As discussed above, the suggestion repository is a lexicon of one or more word combinations (e.g., words or phrases) that is compiled based on a variety of factors including, but not limited to, frequency of usage by a user or plurality of users, language, trending vocabulary, and the like, or some combination thereof.

According to some embodiments, Step 404 involves the user device interacting with a server over a network, and sending any keystroke event as a tuple that includes the text string (i.e., prefix) and a device ID (or another type of identifier associated with the user or device). Thus, according to the examples in FIGS. 5A-5B, the information communicated to the lookup engine 304 is the tuple: (prefix "real", device ID). According to some embodiments, the identifier associated with the device (or user) can be any information utilized to identify the user or user device, such as, but not limited to, a telephone number, email address, user name, IP address, device PIN, and the like.

Step 404's search for text strings returns an initial QAC suggestion listing, referred to as the "beta listing", which comprises a set of text strings (e.g., words or words) as an ordered listing, where the order of the listing of text strings is based on a ranking of each string. As discussed above, the listing of text strings are ranked to identify the text strings that are relevant to the entered (and searched) prefix. In some embodiments, the ranking of the strings in the beta listing is based upon activity information in the suggestion repository 308 that provides an indication of frequency of use of each string stored in the lexicon. In some embodiments, the frequency of use is based on scores that are a product of observed behavior of the user and/or other users on the network, as discussed above. As such, the strings with the higher scores are placed higher, or have a higher priority than lower scoring strings in the beta listing.

By way of a non-limiting example of Steps 402-404, user Bob enters the text string: "new" (Step 402). In Step 404, user Bob's mobile device identifier and the string "new" are communicated to the lexicon database 306 to identify QAC suggestions for Bob. The suggestion repository 308 comprises information associated with the top ranked suggestions for the prefix "new" (as discussed above in relation to FIG. 3). For example, the top suggestions, as ordered may be: "New York Times", "New York Knicks", "New Balance". As discussed above, this ordered/ranked listing can be based on analysis of a global set of users or based on user Bob's activity. Thus, this suggestion listing is the result of Step 404.

In some embodiments, the listing of words returned from the search of Step 404 can comprise any number of words phrases respective all text strings beginning with the prefix, and in some embodiments, the number is capped at a maximum, which can be dynamically altered to accommodate searching and identifying words/phrases more frequently utilized (e.g., common words/phrases).

In Steps 406-416, the list compiled from the suggestion repository 308, referred to as the beta listing, is then re-ranked based on the information associated with applications associated with the user's device. In Step 406, the device ID of the user device for which the input was received (from Step 402) is then utilized as a basis for searching the application repository 310. That is, application information associated with the user device is identified from repository 310. As discussed above, such application information can be associated with installed applications or web-based applications the user device executes over a network.

As discussed above, application information includes, but is not limited to, data (and metadata) indicating the identity of an installed application on the user's device, the identity of a web-based application executing or executed by the device, and information indicating the user's activity performed in connection with such applications. Application information can also provide data indicating when an application was installed, downloaded, last executed or opened, when it was closed, and the like. Application information can also include data indicating what type of application each application is, a category of the application, what type of content can be rendered via the application, and the like. Therefore, Step 406 involves identifying which applications the user device has installed, has currently opened, has recently closed, which actions were performed on such applications, when such activity was performed, and/or some combination thereof.

In Step 408, a determination is made regarding whether the application information corresponds to entered prefix from Step 402. Step 408 involves analyzing the application information in the application repository 310 associated with the device ID from Step 406 to determine whether the application information has any association with the received prefix. According to some embodiments, such determination can be based on the performance of any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like.

For example, utilizing vector analysis as an illustrative example, not to be construed as limiting, the prefix is translated into an n-dimensional vector, where each character in the prefix is a node on the vector. Similarly, another n-dimensional vector is compiled based on translation of the application information from Step 406, where each node corresponds to a specific application. These two vectors are compared, and the overlap between the vectors (or nodes) that satisfies a comparison threshold provides an indication that that application corresponds to the prefix, thereby satisfying Step 408. Thus, based on such analysis, Step 408 can determine whether the user device has associated therewith any applications which correspond to the entered prefix.

In some embodiments, when the entered prefix does not correspond to any application information associated with the user device. Process 400 proceeds to Step 418 where a QAC suggestion listing is displayed to a user, and such QAC suggestion listing is the same as the beta listing. For example, the entered prefix is "finance" yet there are no applications that have identifiable data, whether in their name/identity, purpose or activity within such applications. For example, the user device only has stored thereon weather and sports related applications. This would provide no correlation to a search for "finance" related application information. As such, the beta listing determined from Steps 402-408 is provided as the QAC suggestion listing—Step 418.

If, as a result of Step 408, the determination results in identification of application information (identified in Step 406) corresponding to the entered prefix, then Process 400 proceeds to Step 410. In Step 410, the beta listing is re-ranked according to the application information associated with the user device. That is, the application information determined to correspond to the prefix is then utilized to re-rank the beta listing.

According to some embodiments, the re-ranking of the beta listing can be based on identifying which application (identified in Step 408) is currently opened on the user device. In some embodiments, the re-ranking of the beta listing in Step 408 can be based on identifying which application (identified in Step 4080) was most recently opened on the user device. According to some embodiments, the recency of an application being opened is based on a temporal range, where if an application is opened outside of such temporal range, then such application data may be viewed as "stale", "idle" or "asleep" (e.g., without any activity for a predetermined period of time), and disregarded. Such range can begin when the prefix is received and extend for a predetermined time in the past (e.g., 10 minutes, or 2 hours, or 3 days, for example).

According to some embodiments, this re-ranking can involve comparing such application information against the suggestions (or strings) in the beta listing and re-ordering the beta listing based on such comparison. The suggestion(s) that has the highest scored similarity to the application information from such comparison is placed atop the beta listing, and all other suggestions are re-ordered accordingly. According to some embodiments, the comparison can involve the application of any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like.

By way of example, again utilizing vector analysis as an illustrative example, not to be construed as limiting, the beta listing is translated into an n-dimensional vector where each suggestion in the beta listing is a node on the vector and the dimensional value "n" is based on the number of suggestions in the beta listing. Similarly, another n-dimensional vector is compiled based on translation of the application information determined to correspond to the prefix, where each node corresponds to a specific application. These two vectors are compared, and the overlap between the vectors (or nodes) is scored, such that the scores that satisfy a comparison threshold provide an indication that the application corresponds to the beta listing.

Therefore, based at least on one of the above embodiments, Step 410 involves re-ranking the beta listing (from Step 404) according to the information associated with applications on the user device that were determined to correspond to the entered prefix (from Steps 406-408). This re-ranked (or re-ordered) listing is referred to as the QAC suggestion listing. As discussed above, the re-ranking can be based on the timing the application was installed, opened, closed, whether it is currently opened, whether the application is idling or in "sleep mode" (without any activity for a predetermined period of time), and the like, or some combination thereof. In some embodiments, whether an application is opened, recently closed (according to the temporal range), and the like can be a weighting factor for the re-ranking of the suggestions in the beta listing, where, for example, the determination that an application is currently opened can take precedence over an application that was recently closed.

By way of a non-limiting example, FIGS. 5A-5B illustrate a non-limiting embodiment of Process 400. FIG. 5A and FIG. 5B both include item 502, 504 and 506—item 502 being an application user interface (UI) that is displayed on the user device; item 504 is the search entry input area of the UI 502; and item 506 references the entered prefix, for example: "real".

FIG. 5A illustrates conventional approaches which simply display QAC suggestions based on the input and historical metrics of associated suggestions, as discussed above. For example, from the prefix "real", item 506, item 508 is displayed, which is the beta listing discussed above (Step 418, Step 408 No). The beta listing 508 displays, as illustrated in FIG. 5A, ordered results "real estate", "Real Madrid". Thus, this is the result returned if no app is found on the device that is associated with the entered text, in contrast to the result shown in FIG. 5B, where the Real Madrid soccer app is detected on the device.

Now, via application of the disclosed systems and methods embodied in FIG. 5B, the beta listing 508 can be re-ranked (or re-ordered) as per Step 410. By way of a non-limiting example, if the user in this example has a "RealMadrid" soccer application installed on her device, then the beta listing 508 would be re-ranked to have "Real Madrid" placed atop the listing, which would result in QAC suggestion listing 510: "Real Madrid", "real estate" "realtor.com".

In yet another example, if the user also has the "realestate.com" application installed, yet the realtor.com application was not opened, and the Real Madrid application was currently opened, then the QAC suggestion listing 510 could be re-ordered to: "Real Madrid", "realtor.com", "real estate" (not shown). In this example, since a currently opened application would weighted higher than an application that was closed, the "Real" Madrid" suggestion is placed higher on the suggestion list than the "realtor.com" list; however, since there is the "realtor.com" application installed on the user's device, such suggestion is placed higher on the suggestion list than "real estate."

In Step 412, the QAC suggestion listing is displayed to the user (as illustrated as an example in FIG. 5B). Here, a user can then select a suggestion from the displayed QAC suggestion listing 510, or can continue typing. Step 414. Should the user select a suggestion from the QAC suggestion listing 510, the selected suggestion is then displayed in the search entry input area 504. Step 416. Thus, the user eon then submit the search query. If the user should continue typing, however, then the process 400 repeats (or returns to Step 402). For example, should the user in the examples of FIG. 5A-5B continue typing a "t" after "real", the "t" will be appended to the previous text string "real" (i.e., prefix), and the process 400 will repeat for the new prefix: "realt". In other words, according to some embodiments, for every key stroke (or text/character input), a ranked list of suggested completions is computed and is returned and displayed to the user.

According to some embodiments of the present disclosure, information associated with the QAC suggestion identification, QAC suggestion ranking, and/or selection by a user, as discussed above in relation to Process 400, can be fed back to the predication engine 300 for modeling (or training) of the information stored in database 306 via iterative or recursive bootstrapping or aggregation functionality. This can improve the accuracy of the identification of QAC suggestions presented to a specific user and/or other users on a network. Embodiments of the present disclosure involve the predication engine 300 applying such recursive/bootstrapping functions utilizing any known or to be known open source and/or commercial software machine learning algorithm, technique or technology.

FIG. 6 is a work flow example 600 for serving relevant digital content associated with advertisements (e.g., advertisement content) based on the entered search query, as per the discussion related to FIGS. 3-5B discussed above. For example, in some embodiments, FIG. 6 illustrates how advertisements are served to a user based on at least one of: the entered and/or suggested search characters, category or content of the selected search query, and/or results of the search query. According to some embodiments, the content that forms the basis of the advertisement(s) can be based on a the text entered by the user upon generating the search query, the completed/selected search query, the program utilized in providing suggestions for the completed search query, and the like, or some combination thereof.

By way of a non-limiting example, work flow 600 includes a user entering the search text: "real" on his mobile phone. As discussed above, QAC suggestions are provided to the user based on the "real" prefix text characters as well as on information associated with the determination that the user has a "Real Madrid" soccer application installed on her phone. Therefore, an advertisement associated with tickets for a Real Madrid match can be displayed to the user in a variety of ways. For example, an ad may be displayed in connection with the search query entry page, in connection with the search results, emailed to the user, as a pop-up window, and the like, or some combination thereof.

In Step 602, test of a search query is identified. This text can be based on the QAC process outlined above with respect to FIGS. 3-5B. For purposes of this disclosure, Process 600 will refer to entered text of a single text search as the basis for serving an advertisement(s); however, it should not be construed as limiting, as any number of searches, search characters or content (e.g., a search query formed of a captured image, or any type of media, multimedia or hypermedia) and/or Boolean (and the like) operator(s) connecting search terms can form such basis, without departing from the scope of the instant disclosure.

In Step 604, a context is determined based on the identified text. This context forms a basis for serving advertisements related to the entered text (i.e., relating to the type of content). In some embodiments, the context can be determined by determining a category of content the entered text of Step 602 represents. Thus, Step 604 can involve determining a content type associated with the entered text. In some embodiments, the identification of the context from Step 604 can occur during analysis of the entered text and/or based on the information utilized for suggesting a QAC suggestion(s) (as discussed above in relation to FIGS. 3-5B), after generation of the text suggestions, and/or after, during or before performing the actual search, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to perform the search request. Step 612. In some embodiments, the selected advertisement is sent directly to each user's computing device. In some embodiments, the selected advertisement is displayed in conjunction with the results of the search request on the user's device and/or within the application being used to perform the search.

Figure 7:
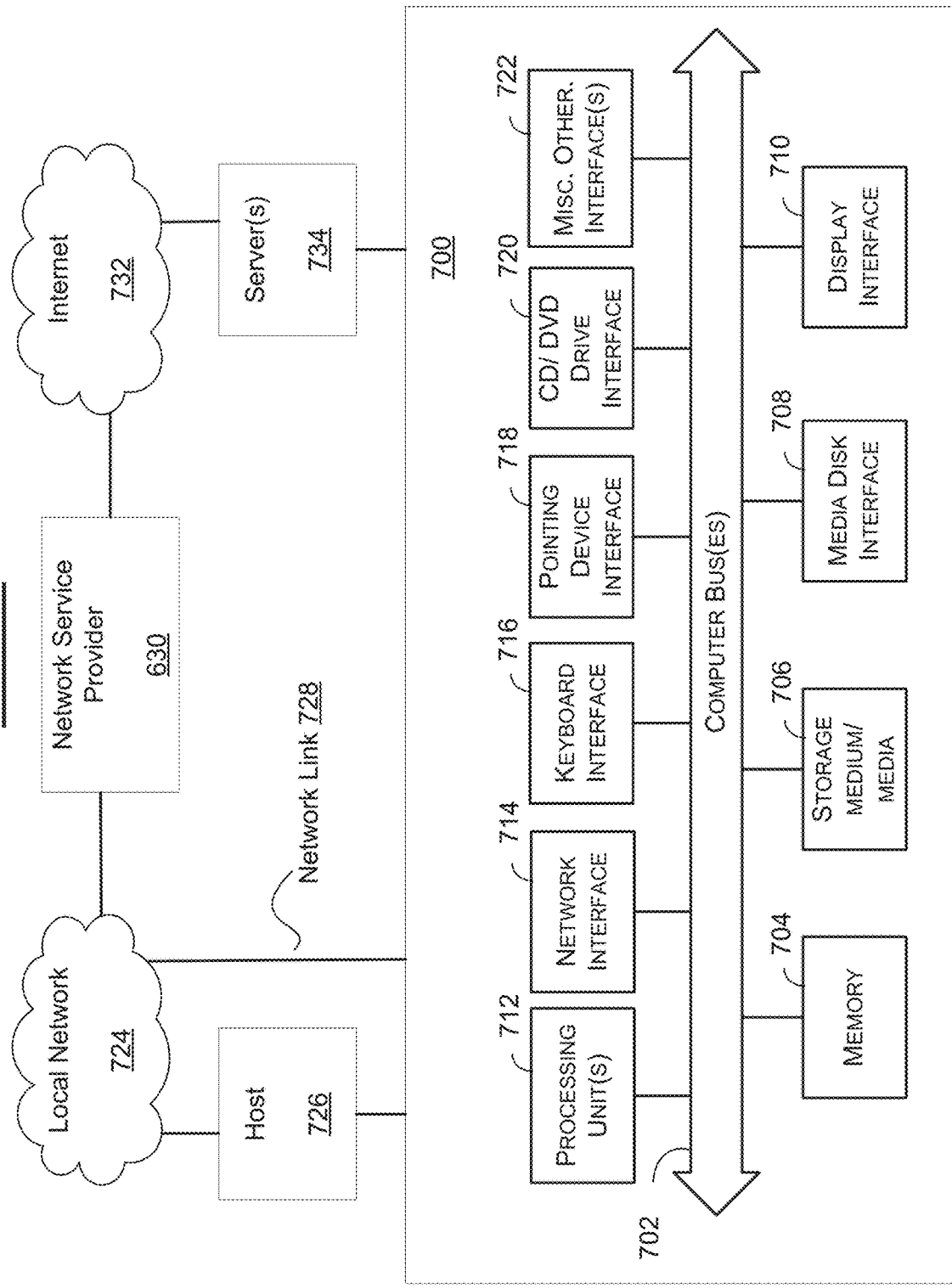
FIG. 7 is a block diagram illustrating architecture of an exemplary hardware device in accordance with one or more embodiments of the present disclosure.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interlace for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a computing device over a network, user input information from a user device, said user input information comprising a character string of at least one character and a device identifier (ID);

determining, via the computing device, a set of text suggestions that begin with the character string from a lexicon database;

identifying, via the computing device, a set of applications installed on the user device based on the device ID;

determining, via the computing device, a status each of the installed applications on the user device, said status comprising information indicating when a respective application has last been opened, a time a respective application has been installed, and whether a respective application is currently opened;

compiling, via the computing device, a query auto-complete (QAC) suggestion listing based on the set of text suggestions and the installed applications, and the installed application's determined status, said QAC suggestion listing comprising text suggestions associated with the installed applications being ranked higher than other text suggestions that are not associated with the installed applications; and communicating, via the computing device over the network, the QAC suggestion listing for display on the user device.

2. The method of claim 1, further comprising:

reranking said QAC suggestion listing based on the status of each installed application, said reranking comprising ordering the QAC suggestion listing such that text suggestions associated with installed applications that are currently opened are ranked higher than text suggestions associated with installed applications that are not currently opened.

3. The method of claim 1, further comprising:

reranking said QAC suggestion listing based on the status of each installed application, said reranking comprising ordering the QAC suggestion listing such that text suggestions associated with installed applications that have been opened more recently are ranked higher than text suggestions associated with installed applications that have been opened less recently.

4. The method of claim 1, further comprising:

determining a type of each of the identified applications on the user device, said type indicating whether a respective application is installed on the user device or is accessed over the network by the user device; and reranking said QAC suggestion listing based on the type of each installed application.

5. The method of claim 4, wherein said reranking comprises ordering the QAC suggestion listing such that text suggestions for installed applications are ranked higher than text suggestions associated with network accessed applications.

6. The method of claim 4, wherein said reranking comprises ordering the QAC suggestion listing such that text suggestions associated with network accessed applications are ranked higher than text suggestions for installed applications.

7. The method of claim 1, further comprising:

receiving a second input indicating a selection of a text suggestion from the QAC suggestion listing; and searching for content based on said second input.

8. The method of claim 1, further comprising:

determining a number of times each text suggestion in the set of text suggestions has been selected during a predetermined period of time; and reranking the set of text suggestions based on said number determination.

9. A non-transitory computer-readable storage medium tangibly encoded with computer-executable instructions, such that when a computing device executes the instructions, a method is performed comprising:

receiving, at the computing device over a network, user input information from a user device, said user input information comprising a character string of at least one character and a device identifier (ID);

determining, via the computing device, a set of text suggestions that begin with the character string from a lexicon database;

identifying, via the computing device, a set of applications installed on the user device based on the device ID;

determining, via the computing device, a status each of the installed applications on the user device, said status comprising information indicating when a respective application has last been opened, a time a respective application has been installed, and whether a respective application is currently opened;

compiling, via the computing device, a query auto-complete (QAC) suggestion listing based on the set of text suggestions and the installed applications, and the installed application's determined status, said QAC suggestion listing comprising text suggestions associated with the installed applications being ranked higher than other text suggestions that are not associated with the installed applications; and communicating, via the computing device over the network, the QAC suggestion listing for display on the user device.

10. The non-transitory computer-readable storage medium of claim 9, further comprising:

reranking said QAC suggestion listing based on the status of each installed application, said reranking comprising ordering the QAC suggestion listing such that text suggestions associated with installed applications that are currently opened are ranked higher than text suggestions associated with installed applications that are not currently opened.

11. The non-transitory computer-readable storage medium of claim 9, further comprising:

reranking said QAC suggestion listing based on the status of each installed application, said reranking comprising ordering the QAC suggestion listing such that text suggestions associated with installed applications that have been opened more recently are ranked higher than text suggestions associated with installed applications that have been opened less recently.

12. The non-transitory computer-readable storage medium of claim 9, further comprising:

determining a type of each of the identified applications on the user device, said type indicating whether a respective application is installed on the user device or is accessed over the network by the user device; and reranking said QAC suggestion listing based on the type of each installed application.

13. The non-transitory computer-readable storage medium of claim 12, wherein said reranking comprises ordering the QAC suggestion listing such that text suggestions for installed applications are ranked higher than text suggestions associated with network accessed applications.

14. The non-transitory computer-readable storage medium of claim 12, wherein said reranking comprises ordering the QAC suggestion listing such that text suggestions associated with network accessed applications are ranked higher than text suggestions for installed applications.

15. The non-transitory computer-readable storage medium of claim 9, further comprising:

receiving a second input indicating a selection of a text suggestion from the QAC suggestion listing; and searching for content based on said second input.

16. The non-transitory computer-readable storage medium of claim 9, further comprising:

determining a number of times each text suggestion in the set of text suggestions has been selected during a predetermined period of time; and reranking the set of text suggestions based on said number determination.

17. A computing device comprising:

a processor; and a non-transitory computer-readable storage medium for tangibly storing thereon program logic for execution by the processor, the program logic comprising:

logic executed by the processor for receiving, at the computing device over a network, user input information from a user device, said user input information comprising a character string of at least one character and a device identifier (ID);

logic executed by the processor for determining, via the computing device, a set of text suggestions that begin with the character string from a lexicon database;

logic executed by the processor for identifying, via the computing device, a set of applications installed on the user device based on the device ID;

logic executed by the processor for determining, via the computing device, a status each of the installed applications on the user device, said status comprising information indicating when a respective application has last been opened, a time a respective application has been installed, and whether a respective application is currently opened;

logic executed by the processor for compiling, via the computing device, a query auto-complete (QAC) suggestion listing based on the set of text suggestions and the installed applications, and the installed application's determined status, said QAC suggestion listing comprising text suggestions associated with the installed applications being ranked higher than other text suggestions that are not associated with the installed applications; and logic executed by the processor for communicating, via the computing device over the network, the QAC suggestion listing for display on the user device.

18. The computing device of claim 17, further comprising:

logic executed by the processor for determining a type of each of the identified applications on the user device, said type indicating whether a respective application is installed on the user device or is accessed over the network by the user device; and logic executed by the processor for reranking said QAC suggestion listing based on the type of each identified application.

* * * * *